(12) United States Patent
Craft (10) Patent No.: US 7,455,281 B2
(45) Date of Patent: Nov. 25, 2008

(54) SPIGOT

(75) Inventor: Charles William Craft, Apple Creek, OH (US)

(73) Assignee: Rubbermaid Incorporated, Huntersville, NC (US)

(*) Notice: Subject to any disclaimer, the term of this patent is extended or adjusted under 35 U.S.C. 154(b) by 73 days.

(21) Appl. No.: 11/538,254

(22) Filed: Oct. 3, 2006

(65) Prior Publication Data
US 2008/0078970 A1 Apr. 3, 2008

(51) Int. Cl.
*F16K 31/00* (2006.01)
(52) U.S. Cl. .................. 251/335.2; 251/144; 222/518
(58) Field of Classification Search .......... 251/144, 251/335.2; 222/511, 518
See application file for complete search history.

(56) References Cited

U.S. PATENT DOCUMENTS

| | | | |
|---|---|---|---|
| 4,363,681 A | * | 12/1982 | Williams ............... 156/64 |
| D270,704 S | | 9/1983 | Ruxton et al. |
| 4,452,425 A | | 6/1984 | Lucking |
| 4,664,297 A | * | 5/1987 | Giovinazzi ............ 222/185.1 |
| 4,742,851 A | | 5/1988 | Lundblade |
| 6,470,910 B2 | * | 10/2002 | Blackbourn et al. ...... 137/588 |
| 6,631,744 B1 | * | 10/2003 | Gerhart et al. ............ 141/22 |
| 6,742,680 B2 | * | 6/2004 | Friedman ............... 222/509 |

* cited by examiner

*Primary Examiner*—John K Fristoe, Jr.
(74) *Attorney, Agent, or Firm*—Dennis J. Williamson; Moore & Van Allen, PLLC (57) ABSTRACT

The spigot comprises a conduit that communicates with the interior of the container to which the spigot is attached. The conduit communicates with a valve body that comprises a chamber that includes an opening that is selectably opened and closed by a valve element. The valve element may be movable into and out of engagement with a valve seat formed around the opening. The valve element may be biased to the closed position by a spring such as an elastomeric diaphragm. The elastmeric diaphragm may seal the chamber and be exposed such that depressing the diaphragm moves the valve element from the normally closed position to an open position. The valve body may be disposed such that it extends from the first conduit at an angle. The opening in the valve body communicates with a second conduit that extends from the valve body to receive the flow of fluid.

18 Claims, 8 Drawing Sheets

SPIGOT

The invention relates generally to spigots and more particularly to a spigot suitable for use in jugs, coolers and other containers.

BACKGROUND

Spigots are known for use in coolers, insulated jugs, cartons and other liquid containers. Such spigots dispense the liquid by allowing gravity to drain the liquid from the container when the spigot is opened. Typically, the spigots include a button or lever that moves a valve element away from a valve seat to open a conduit to allow the liquid to drain from the container. The valve element may be biased to the closed position by a spring such as an elastomeric diaphragm. One such spigot is shown in U.S. Pat. No. 4,452,425 issued on Jun. 5, 1984 to Lucking. Another such spigot is shown in U.S. Pat. No. 4,742,851 issued on May 10, 1988 to Lundblade.

While such spigots are known, the known spigots suffer from at least one of a number of shortcomings. There is a need for a spigot that has a low cost of manufacture, is ergonomically comfortable to actuate, has quick and certain shut-off, has good volume flow and dispenses a flow of liquid that does not spray or splatter.

SUMMARY OF THE INVENTION

The spigot of the invention comprises a conduit that communicates with the interior of the container to which the spigot is attached. The conduit communicates with a valve body that comprises a chamber that includes an opening that is selectably opened and closed by a valve element. The valve element may be movable into and out of engagement with a valve seat formed around the opening. The valve element may be biased to the closed position by a spring such as an elastomeric diaphragm. The elastomeric diaphragm may seal the chamber and be exposed such that depressing the diaphragm moves the valve element from the normally closed position to an open position. The valve body may be disposed such that it extends from the first conduit at an angle. The opening in the valve body communicates with a second conduit that extends from the valve body to receive the flow of fluid.

DETAILED DESCRIPTION OF EMBODIMENTS OF THE INVENTION

Figure 6:
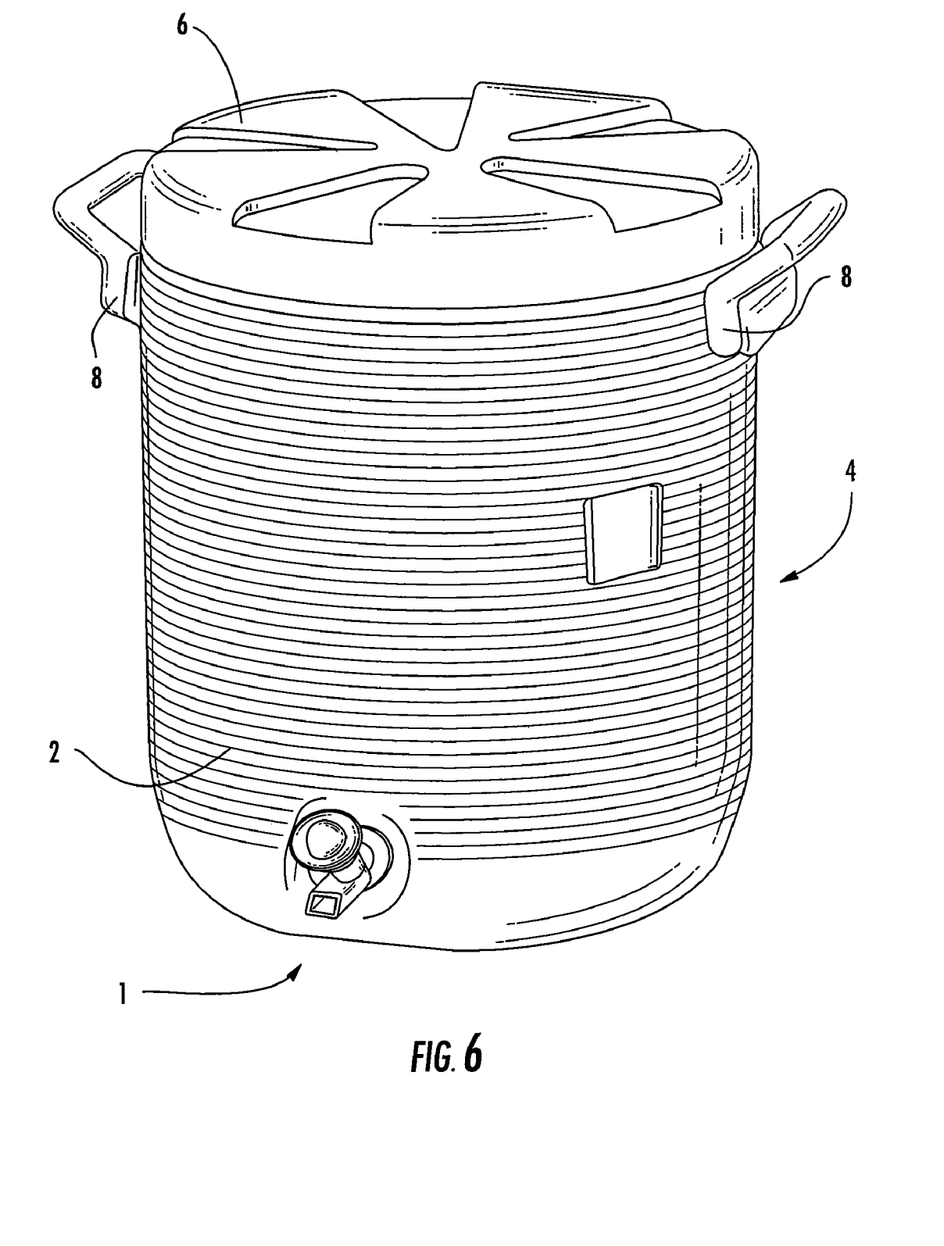
FIG. 6 shows the spigot of FIG. 1 mounted on a container.

FIG. 6 shows an embodiment of the spigot of the invention generally at 1 mounted to the side wall 2 of container 4. In the arrangement illustrated in FIG. 6 container 4 comprises an insulated jug of the type used for storing and dispensing cold liquids such as beverages. The jug may comprise a dual walled insulated construction having a removable top 6 for filling the jug and handles 8 for carrying the jug. While the spigot 1 is illustrated on an insulated beverage jug, it is to be understood that container 4 may be any container where dispensing of liquids using the spigot 1 is desired including coolers, cartons, bottles, tubs, boxes or the like.

Referring to FIGS. 1 through 5 spigot 1 includes a first conduit 10 having a passageway 12 that is open at its first end 14. Passageway 12 communicates with the interior of the container 4 to allow liquid to flow into open end 14 and through the passageway 12. Conduit 10 may be mounted to the sidewall 2 of a container 4. To mount the conduit 10 to the container 4 external screwthreads 16 are formed on the conduit 10. The conduit 10 is inserted through an aperture 7 formed in sidewall 2 such that the screwthreads 16 are exposed on the interior of the container 4. An internally threaded nut 18 engages screwthreads 16 to trap sidewall 2 between the nut 18 and a flange 20 formed on the conduit 10 when the nut 18 is tightened on the screwthreads 16. A grommet 22 may be located between the nut 18 and the sidewall 2 to create a liquid tight seal. In the illustrated embodiment the conduit 10 extends substantially perpendicular from sidewall 2.

Conduit 10 is connected to and is in fluid flow communication with valve body 30. Valve body 30 comprises an internal chamber 32 that is open at one end at opening 34 and is open at the other end at valve seat 36. Conduit 10 is open at its second end 15 that communicates with internal chamber 32 of valve body 30 at a midpoint thereof. Valve seat 36 includes an annular ring 38 that engages a valve element 46 of valve stem 42 to close the valve. Valve element 46 or valve seat 36 may be provided with a bead 40 to create a liquid tight seal therebetween. The opposite end 34 of the valve body 30 is sealed by a diaphragm 50.

Valve stem 42 comprises a shaft 44 that has a bell or frustoconical shaped valve element 46 formed at one end thereof. The external shape of valve element 46 is determined such that the external surface of valve element 46 engages valve seat 36 to create a liquid tight seal therebetween. Valve stem 42 is supported by support element 48 such that the valve stem 42 may reciprocate along its longitudinal axis to seat and unseat valve element 46 on valve seat 36. The support element 48 may comprise legs 48a that support a ring 48b where shaft 44 may freely reciprocate in the ring 48b along its length but is constrained from movement in other directions.

The valve body 30 is disposed an oblique angle relative to the conduit 10 such that the diaphragm 50 projects away from the side wall 2 of container 4 when conduit 10 is mounted to wall 2. The longitudinal axis of valve stem 44 (the axis of movement) is at an oblique angle relative to conduit 10 such that the direction of the force required to open the spigot is at an angle relative to sidewall 2. Angling the valve body 30 and valve stem 44 relative to the conduit 10 creates a more ergonomically comfortable spigot where it is easier for the user to access and depress the diaphragm 50. In one embodiment the longitudinal axis of valve stem 44 is arranged at approximately 45 degrees relative to the longitudinal axis of conduit 10 such that valve stem 44 is also at a 45 degree angle from the sidewall 2. In this arrangement the diaphragm 50 is displaced a distance d from the sidewall 2 and the force exerted by the user on the diaphragm 50 is at a 45 degree angle to the container 4 such that the diaphragm 50 can be easily accessed and manipulated.

Figure 5:
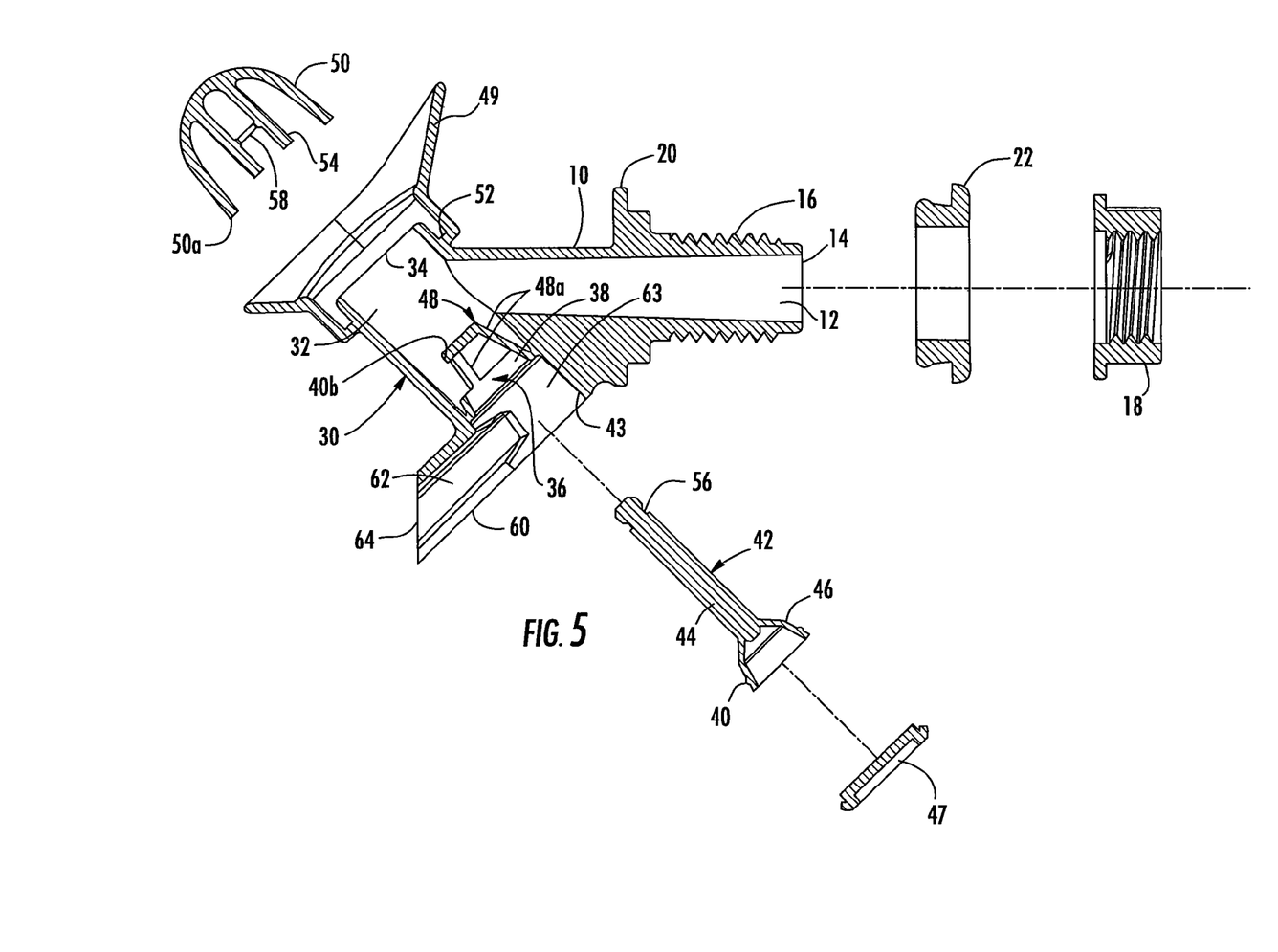
FIG. 5 is an exploded section view of the spigot of FIG. 1.

Referring to FIG. 5, to assemble the spigot, valve body 30 is formed with an opening 43 at its end adjacent the valve seat 36. The valve stem 42 is inserted through opening 43, through ring 48b and into sleeve 54 of diaphragm 50. A spigot cap 47 is secured over opening 43 to seal the valve body 30 such as by sonic or spin welding or adhesive or the like.

Figure 1:
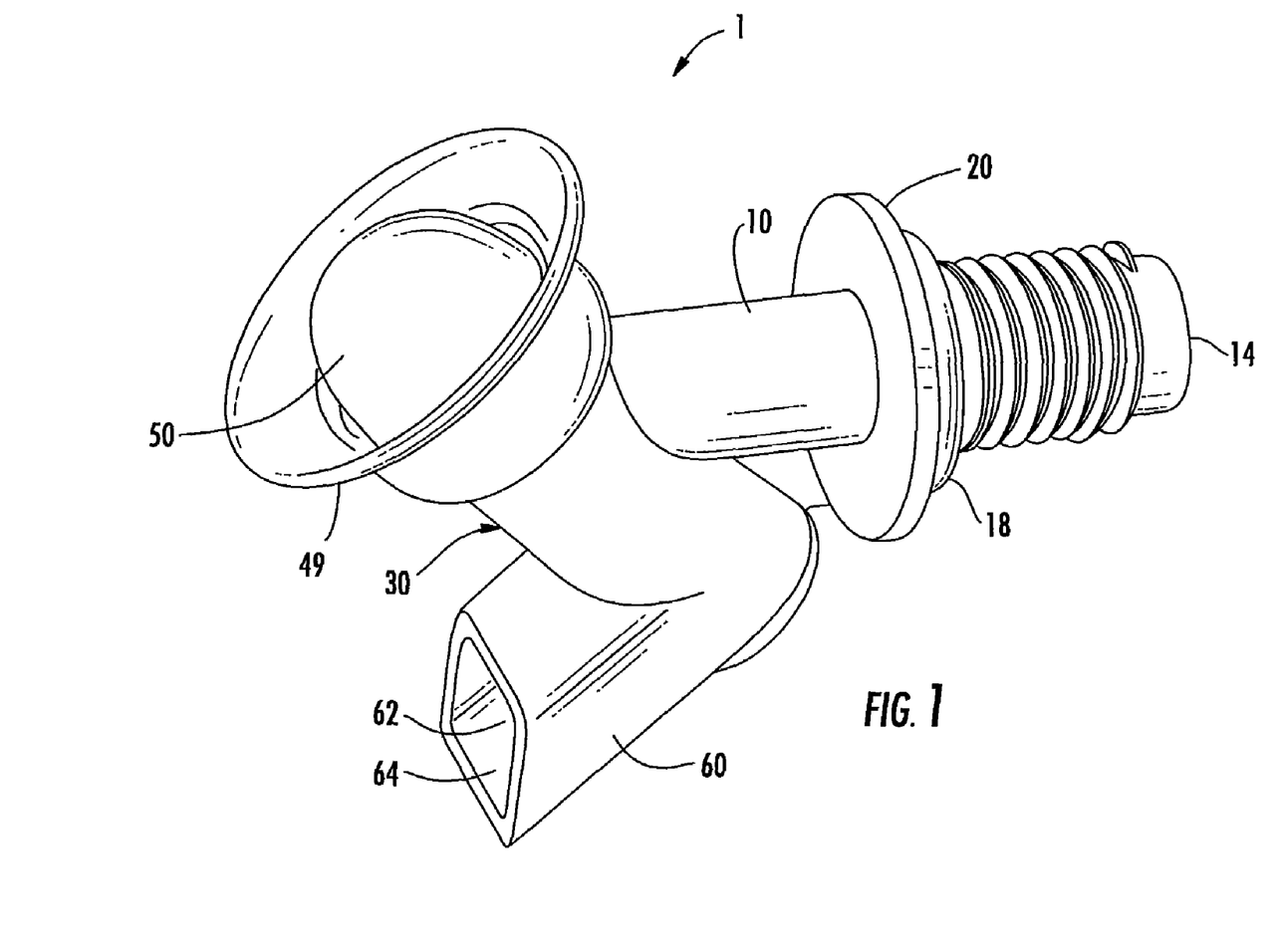
FIG. 1 is a perspective view of one embodiment of the spigot of the invention.
Figure 2:
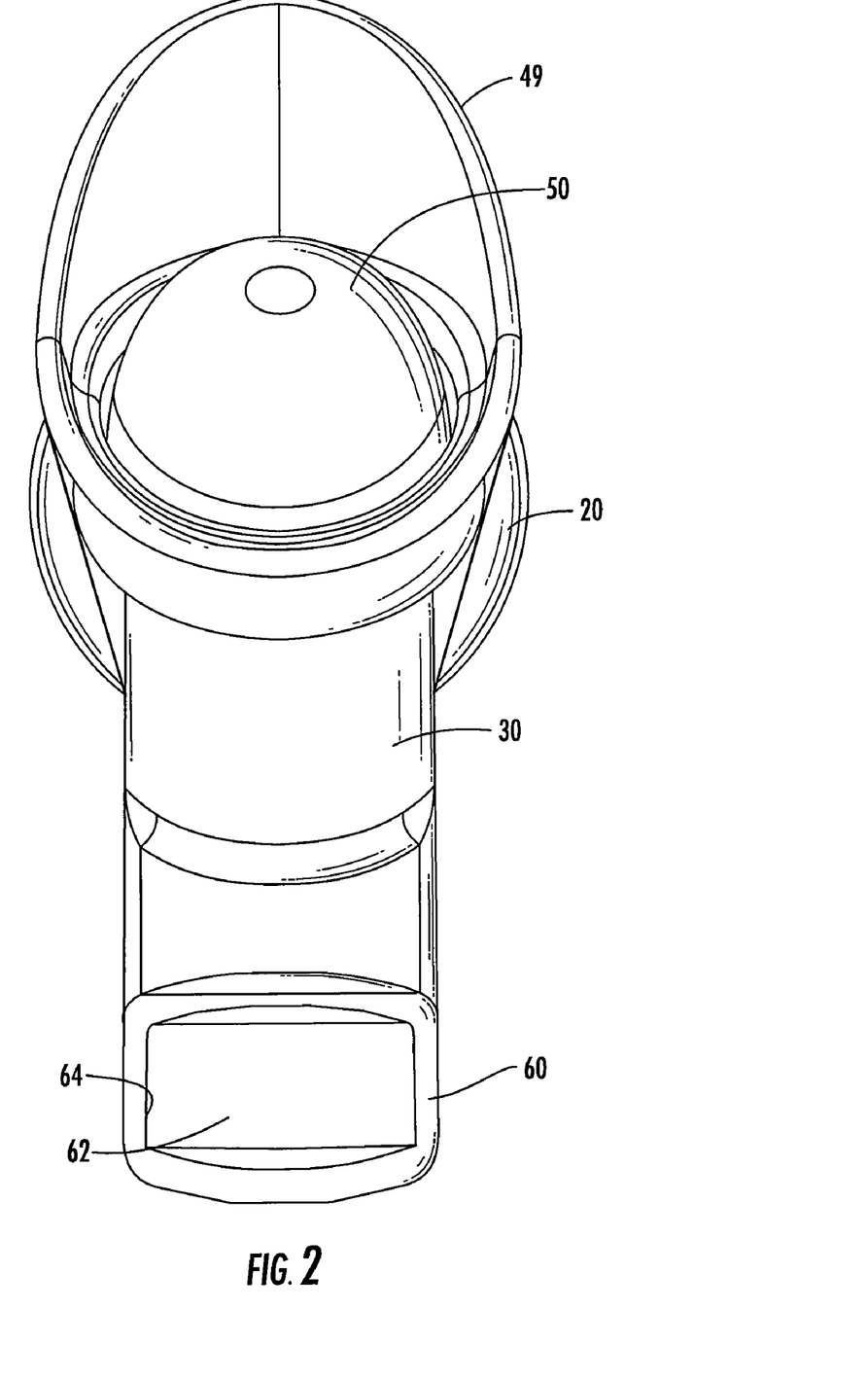
FIG. 2 is a front view of the spigot of FIG. 1.
Figure 3:
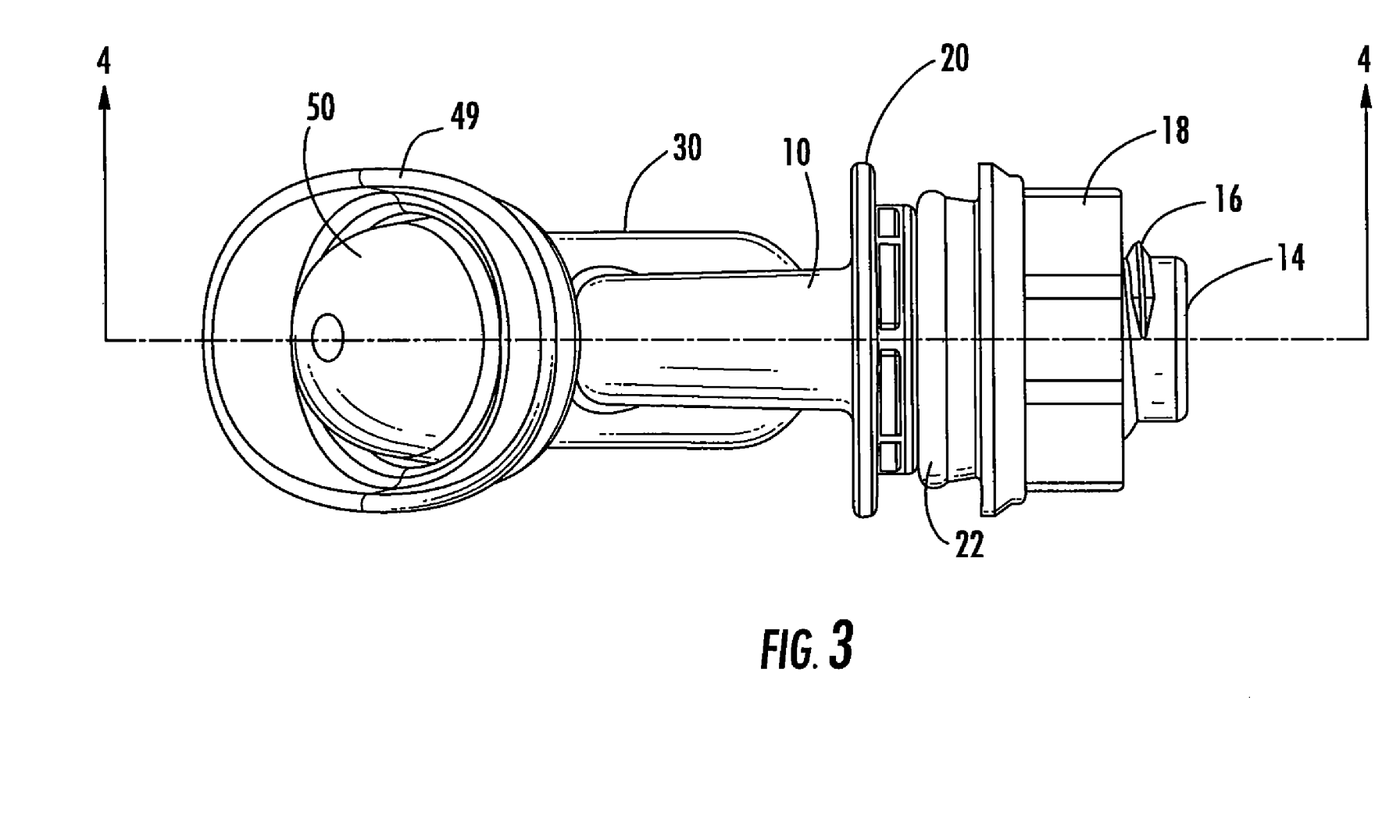
FIG. 3 is a top view of the spigot of FIG. 1.
Figure 4:
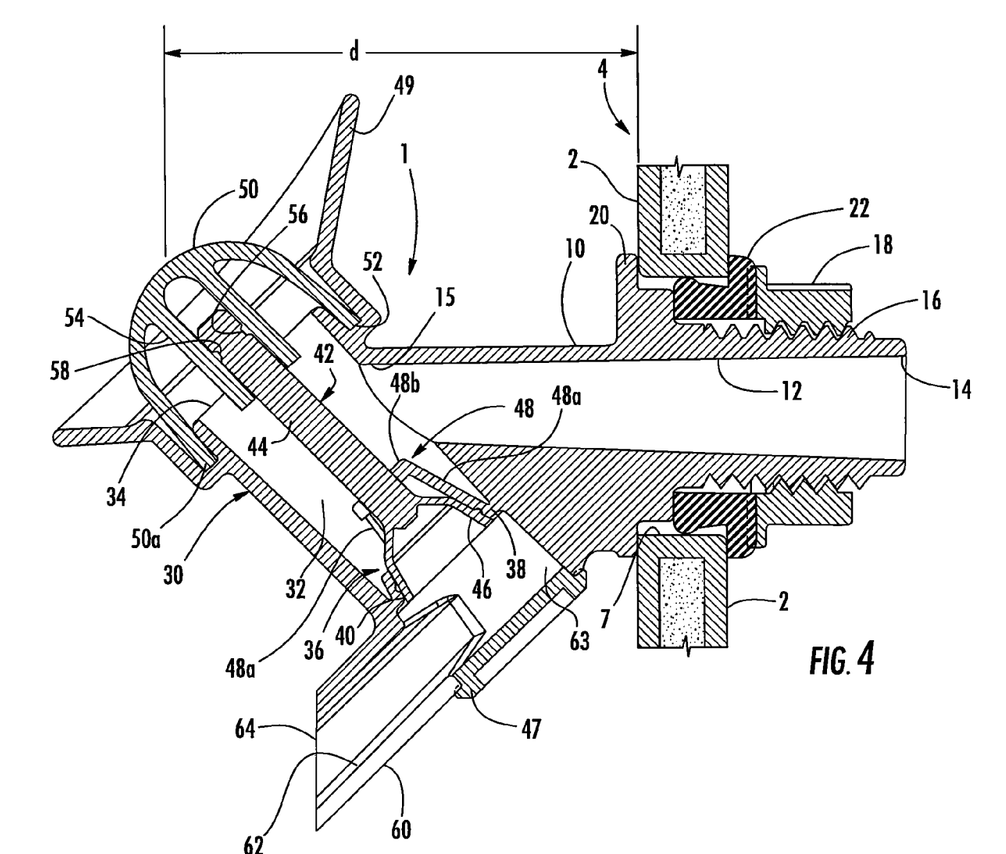
FIG. 4 is a section view taken along line 4-4 of FIG. 3.

Diaphragm 50 is constructed of a flexible, liquid impermeable material such as an elastomer and is formed to have an umbrella or dome shape. The edge 50a of diaphragm 50 is fixed in an annular recess 52 formed about the opening 34 to create a liquid tight seal between valve body 30 and diaphragm 50. The edge 50a of diaphragm 50 may be retained in recess 52 by compressing the material of the diaphragm in the recess, by adhesive, by sonic or spin welding by other method or by a combination of such methods. The diaphragm 50 includes a cylindrical sleeve 54 that extends toward valve stem 42 and encompasses and is connected to shaft 44. In one embodiment an annular groove 56 is formed around the distal end of shaft 44. An annular projection 58 located in sleeve 54 engages groove 56 such that the valve stem 44 moves with the diaphragm 50. The diaphragm 50 has a natural resiliency and is formed such that when it is deformed, it will return to the illustrated shape and position where valve element 46 is seated on valve seat 36 to close the valve and prevent flow of liquid through the spigot. The diaphragm 50 may be depressed by a user to move the valve element 46 away from valve seat 36 to open the spigot and allow liquid to flow through the valve body. A finger grip 49 is provided around diaphragm 50 to allow the user to grip the spigot while depressing diaphragm 50.

When the diaphragm 50 is released the diaphragm returns to its original shape to move the valve element to the closed position shown in FIG. 4. While in the illustrated embodiment the diaphragm 50 seals the valve body 30 and biases the valve stem 42 to the closed position, a separate spring may be used to bias the valve to the closed position.

A second conduit 60 is in fluid flow communication with the valve body 30. Conduit 60 includes a passageway 62 that is open at its first end 64 such that end 64 forms a pour spout where the liquid leaves the spigot. The opposite end 63 of passageway 62 communicates with the opening in valve body 30 formed by valve seat 36 to allow liquid to flow from the valve body 30 into passageway 62. In one embodiment, first conduit 10, valve body 30 and second conduit 60 may be formed of an integral piece of molded plastic although these elements may be made separately and connected to one another and may be made of any suitable material. The conduit 60 is disposed at an oblique angle relative to the first conduit 10 and sidewall 2 such that liquid flows through passageway 62 by gravity as well as under the pressure created by the liquid in container 4. In one embodiment conduit 60 is arranged perpendicular to the longitudinal axis of the valve stem 42.

When the valve element 46 moves way from valve seat 36 opening the spigot, liquid flows over valve element 46 and out of valve body 30. As the liquid flows over valve element 46, the bell shape of this element cause the liquid to spray and splatter as it flows from chamber 32. In prior art arrangements the valve element is located at or near the end of the spigot. As a result the fluid flowing from the spigot tends to spray and splatter creating a creating a mess and making the dispensing of liquid difficult. In the spigot of the invention, the fluid flowing over valve element 46 flows into and is captured within conduit 60 such that the splatter and spray that may result as the liquid flows over valve element 46 is located internally of the spigot. The liquid flows through passageway 62 of conduit 60 where the flow of fluid becomes smoother such that by the time the flow reaches opening 64 the flow of liquid is smooth and steady. Thus, external splatter and spray is largely eliminated and a good volume flow is created.

Figure 7:
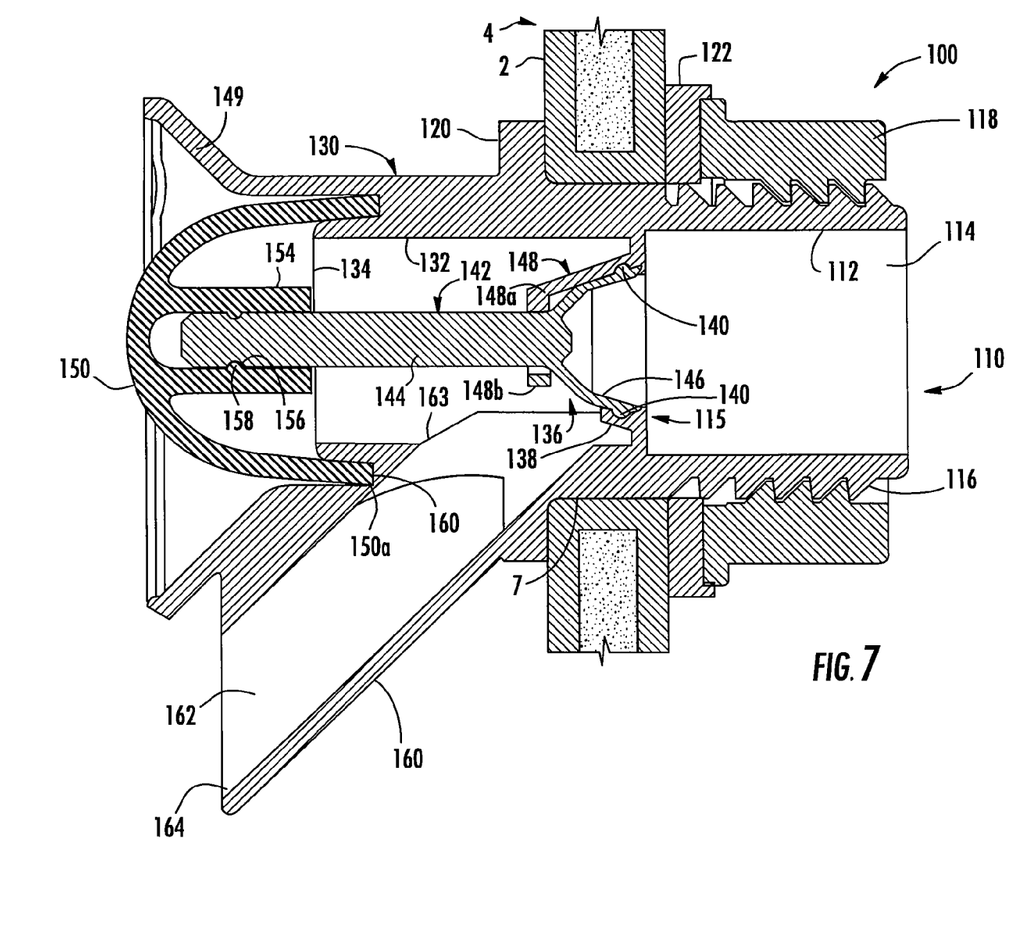
FIG. 7 is a section view of another embodiment of the spigot of the invention.
Figure 8:
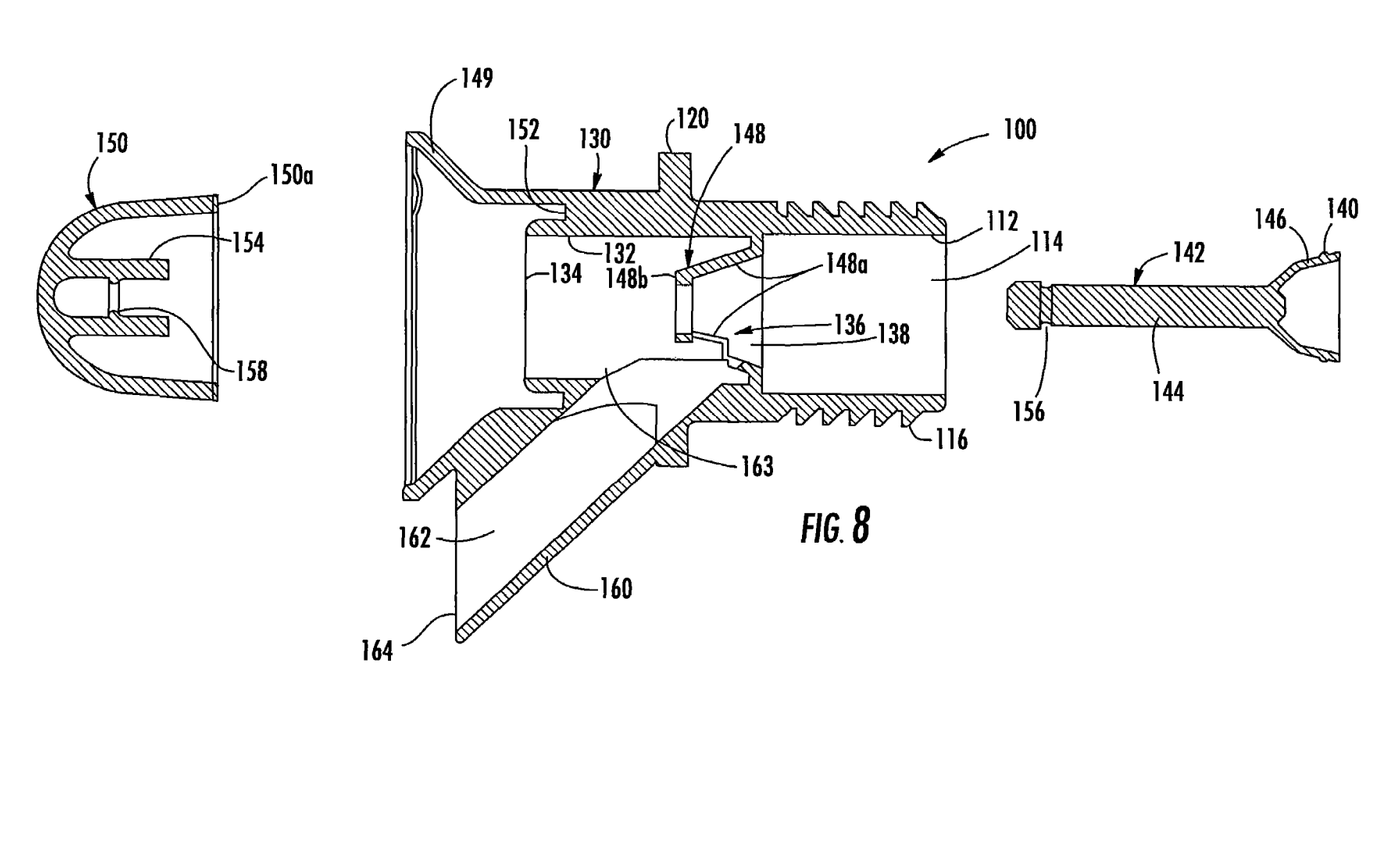
FIG. 8 is an exploded section view of the spigot of FIG. 7.

An alternative embodiment of the invention is shown in FIGS. 7 and 8. Spigot 100 includes a first conduit 110 having a passageway 112 that is open at its first end 114. Passageway 112 communicates with the interior of the container 4 to allow liquid to flow into open end 114 and through the passageway 112. Conduit 110 may be mounted to the sidewall 2 of a container 4. To mount the conduit 110 to the container 4 external screwthreads 116 are formed on the conduit and the conduit is inserted through an aperture 7 formed in sidewall 2 such that the screwthreads 116 are exposed interior of the container. An internally threaded nut 118 engages screwthreads 116 to trap sidewall 2 between the nut 118 and a flange 120 formed on the conduit 110 as the nut is tightened on the screwthreads 116. A grommet 122 may be located between the nut 118 and the sidewall 2 to create a liquid tight seal. Conduit 110 is positioned substantially perpendicular to sidewall 2.

Conduit 110 is connected to and is in fluid flow communication with valve body 130. Valve body 130 comprises an internal chamber 132 that is open at one end at opening 134 and is open at the other end at valve seat 136. Conduit 110 is open at its second end 115 that communicates with internal chamber 132 of valve body 130 at valve seat 136. Valve seat 136 includes an annular ring 138 that engages valve element 146 of valve stem 142 to close the valve. A bead 140 may be formed on the valve seat or annular ring to provide a liquid tight seal. A diaphragm 150 is depressed by the user to open the valve as will hereinafter be described. The valve body 130 is axially aligned with the conduit 110 such that the direction of movement of valve stem 142 is parallel to and coaxial with conduit 110. The direction of movement of valve stem 142 is also at approximately a 90 degree angle relative to the side wall 2 of container 4 and the movement of diaphragm 150 to open the spigot is substantially perpendicular to the container sidewall.

Valve stem 142 comprises a shaft 144 that has a frustoconical or bell shaped valve element 146 formed at one end thereof. The external shape of valve element 146 is determined such that the external surface of valve element 146 valve seat 136 to create a liquid tight seal therebetween. Valve stem 142 is supported by support element 148 such that the valve stem 142 may reciprocate along its longitudinal axis to seat and unseat valve element 146 on valve seat 136. The support element 148 may comprise legs 148a that support a ring 148b where shaft 144 may freely reciprocate in the ring 148b along its length but is constrained from movement in other directions.

Diaphragm 150 is constructed of a flexible, liquid impermeable material such as an elastomer and is formed to have an umbrella or dome shape. The lower edge 150a of diaphragm 150 is fixed in an annular recess 152 formed about the opening 134 to create a liquid tight seal. The edge 150a of diaphragm 150 may be retained in recess 152 by compressing the material of the diaphragm in the recess, by adhesive, by sonic welding by other method or by a combination of such methods. The diaphragm 150 includes a cylindrical sleeve 154 that extends toward valve stem 142 and encompasses and is connected to shaft 144. In one embodiment an annular groove 156 is formed around the end of shaft 144. An annular projection 158 located inside of sleeve 154 engages groove 156 such that the valve stem 144 moves with the diaphragm. The diaphragm 150 has a natural resiliency and is formed such that when it is deformed, it will return to the illustrated shape and position where valve element 148 is seated on valve seat 136 to close the valve and prevent flow of liquid through the spigot. The diaphragm 150 may be depressed by a user to move the valve element 148 away from valve seat 136 to open the spigot and allow liquid to flow through the valve body. A finger grip 149 is provided around diaphragm 150 to allow the user to grip the spigot while depressing diaphragm 150.

When the diaphragm 150 is released the diaphragm returns to its original shape to move the valve element to the closed position. While in the illustrated embodiment the diaphragm 150 seals the valve body 130 and biases the valve stem 142 to the closed position, a separate spring may be used to bias the valve to the closed position.

A second conduit 160 is in fluid flow communication with the valve body 130. Conduit 160 has a passageway 162 that is open at its first end 164 such that end 164 forms a pour spout where the liquid leaves the spigot. Passageway 162 communicates with an opening 163 in valve body 130 to allow liquid to flow from the valve body 130 into passageway 162. In one embodiment first conduit 110, valve body 130 and second conduit 160 may be formed of an integral piece of molded plastic although these elements may be made separately and connected to one another and may be made of any suitable material. Conduit 160 is arranged at an oblique angle relative to conduit 110 such that liquid flows through passageway 112 by gravity as well as the pressure created by the liquid in container 4. In one embodiment, conduit 160 is arranged at approximately a 45 degree angle relative to conduit 110 and sidewall 2.

As the liquid flows around valve element 146 and through valve seat 136 the liquid flow becomes very turbulent causing it to spray and splatter as it flows from chamber 132. In prior art arrangements the valve element is located at the end of the spigot. As a result the fluid flowing from the spigot tends to spray and splatter creating a creating a mess and making the dispensing of liquid difficult. In the arrangement of the invention shown in the Figures, the fluid flowing around valve element 146 flows into and is captured within conduit 160 such that the splatter and spray that may result as the liquid flows over valve element 146 is located internally of the spigot. The liquid flows through conduit 160 where the flow of fluid becomes smoother such that by the time the flow reaches opening 164 the flow of liquid is smooth and steady. Thus, external splatter and spray is largely eliminated and a good volume flow is created.

While embodiments of the invention are disclosed herein, various changes and modifications can be made without departing from the spirit and scope of the invention. One of ordinary skill in the art will recognize that the invention has other applications in other environments. Many embodiments are possible. The following claims are in no way intended to limit the scope of the invention to the specific embodiments described above.

The invention claimed is:

1. A spigot comprising:
a rigid first conduit in fluid communication with a container;
a valve body in fluid flow communication with the first conduit disposed at an oblique angle relative to the first conduit;
a valve element for selectively moving between an open position and a closed position to control flow of liquid from the valve body, said valve element disposed in said valve body and at said oblique angle relative to the first conduit such that a diaphragm for actuating the valve element projects away from the container; and
a second conduit in fluid communication with the valve body such that fluid flowing from said valve body will enter the second conduit and is dispensed from an opening in the second conduit where said second conduit is disposed at a second oblique angle relative to the first conduit such that the opening projects away from the container.

2. The spigot of claim 1 wherein fluid flows over the valve element when the valve element is in the open position.

3. The spigot of claim 1 wherein the valve element moves linearly.

4. The spigot of claim 1 wherein diaphragm is flexible.

5. The spigot of claim 4 wherein the diaphragm is manipulated to move the valve element to the open position.

6. The spigot of claim 4 wherein the diaphragm biases the valve element to the closed position.

7. The spigot of claim 4 wherein the diaphragm closes an opening in the valve body.

8. The spigot of claim 1 wherein the liquid leaves the valve body in a turbulent state and the flow of the liquid becomes smoother in the second conduit.

9. The device of claim 1, wherein the force required to move the valve element to the open position is along said oblique angle.

10. A liquid dispensing device comprising:
a container having a vertical sidewall;
a rigid first conduit in fluid communication with said side wall;
a valve body having an upper end and a lower end and being in fluid flow communication with the first conduit and disposed at an oblique angle relative to the first conduit such that said upper end is disposed farther from the sidewall than the lower end;
a valve element for selectively moving between an open position and a closed position to control flow of liquid from the valve body, said valve element disposed in said valve body and at said oblique angle relative to the first conduit such that a diaphragm for actuating the valve element is located at said upper end and projects away from the container; and
a second conduit in fluid communication with the valve body such that fluid flowing from said valve body will enter the second conduit and is dispensed from an opening in the second conduit where said second conduit is disposed at a second oblique angle relative to the first conduit such that the opening projects away from the side wall.

11. The device of claim 10 wherein fluid flows over the valve element when the valve element is in the open position.

12. The device of claim 10 wherein the valve element moves linearly.

13. The device of claim 10 wherein the diaphragm is flexible.

14. The device of claim 13 wherein the diaphragm is manipulated to move the valve element to the open position.

15. The device of claim 13 wherein the diaphragm biases the valve element to the closed position.

16. The device of claim 10 wherein the liquid leaves the valve body in a turbulent state and the flow of the liquid becomes smoother in the second conduit.

17. The device of claim 10 wherein the container is insulated.

18. The device of claim 10, wherein the force required to move the valve element to the open position is along said oblique angle.

* * * * *